(12) United States Patent
Biard et al.

(10) Patent No.: US 6,688,619 B2
(45) Date of Patent: Feb. 10, 2004

(54) VEHICLE AXLE CROSSPIECE WITH ANTIROLL ARTICULATIONS AND VEHICLE AXLE COMPRISING SAME

(75) Inventors: Vincent Biard, Modena (FR); Michel Blondelet, Le Crest (FR)

(73) Assignee: Compagnie Générale des Etablissements Michelin-Michelin & Cie (FR)

(*) Notice: Subject to any disclaimer, the term of this patent is extended or adjusted under 35 U.S.C. 154(b) by 0 days.

(21) Appl. No.: 10/246,489

(22) Filed: Sep. 18, 2002

(65) Prior Publication Data

US 2003/0071516 A1 Apr. 17, 2003

Related U.S. Application Data

(63) Continuation of application No. PCT/FR01/00706, filed on Mar. 9, 2001.

(30) Foreign Application Priority Data

Mar. 22, 2000 (FR) .............................................. 00 03633

(51) Int. Cl.[7] .......................... B60G 3/08; B60G 21/05; B60G 21/06; B60B 35/00
(52) U.S. Cl. ...................... 280/124.111; 280/124.106; 280/124.116; 301/124.1; 267/189; 267/281
(58) Field of Search .............................. 301/124.1, 127; 280/124.106, 124.107, 124.11, 124.111, 124.114, 124.116, 124.121, 124.13, 124.131, 124.132, 124.133, 124.14; 267/189, 279, 280, 281

(56) References Cited

U.S. PATENT DOCUMENTS

| | | | | |
|---|---|---|---|---|
| 2,270,572 A | | 1/1942 | Woolson et al. ............... 267/21 |
| 2,596,411 A | * | 5/1952 | Jordan ......................... 280/276 |
| 3,464,716 A | * | 9/1969 | Butler ..................... 280/124.111 |
| 3,473,821 A | * | 10/1969 | Barenyi et al. ......... 280/124.111 |
| 3,589,700 A | * | 6/1971 | Ruet et al. ................. 280/5.515 |
| 3,601,424 A | * | 8/1971 | Badland ................. 280/124.13 |
| 3,601,426 A | | 8/1971 | Hury et al. .................. 280/124 |
| 3,767,224 A | | 10/1973 | Schneeweiss ............... 280/124 |
| 4,765,650 A | * | 8/1988 | Kameshima et al. .. 280/124.116 |
| 4,830,400 A | * | 5/1989 | Penot ..................... 280/124.13 |
| 5,246,248 A | * | 9/1993 | Ferguson ................. 280/5.524 |
| 5,597,175 A | * | 1/1997 | Tuan ..................... 280/124.111 |
| 6,074,016 A | | 6/2000 | Blondelet et al. ........... 301/127 |

FOREIGN PATENT DOCUMENTS

| | | |
|---|---|---|
| DE | 1630901 | 2/1971 |
| DE | 2361009 | 6/1975 |
| EP | 0114790 | 8/1984 |
| WO | 9747486 | 12/1997 |

OTHER PUBLICATIONS

Patent Abstract of Japan: Nishi Takashi, Publication No. 03244841, published Oct. 31, 1991.

* cited by examiner

*Primary Examiner*—S. Joseph Morano
*Assistant Examiner*—Jason R. Bellinger
(74) *Attorney, Agent, or Firm*—Baker Botts L.L.P.

(57) ABSTRACT

A vehicle axle crosspiece includes inner and outer tubes extending crosswise of the vehicle, with the axially outer end of the outer tube being connected to a wheel arm on one side of the vehicle and the axially outer end of the inner tube being connected to a wheel arm on the other side of the vehicle. The inner and outer tubes are joined together by at least two axially-spaced antiroll articulations of elastomeric material housed between the inner and outer tubes. Each of the two antiroll articulations has its own radial stiffness and is assigned a coefficient proportional to its radial stiffness. The center of inertia of the antiroll articulations is closer to the wheel arm connected to the outer tube than to the wheel arm connected to the inner tube.

14 Claims, 1 Drawing Sheet

VEHICLE AXLE CROSSPIECE WITH ANTIROLL ARTICULATIONS AND VEHICLE AXLE COMPRISING SAME

CROSS REFERENCE TO THE RELATED APPLICATION

This is a continuation of international application PCT/FR 01/00706 filed Mar. 9, 2001, which was published in French on Sep. 27, 2001 as international publication WO 01/70527 and which claims priority of French application No. 00/03633 filed Mar. 22, 2000.

BACKGROUND OF THE INVENTION

The present invention relates to a vehicle axle crosspiece of the kind which includes a first tube, one end of which is fixed to a wheel arm situated on one side of the vehicle, and the other end of which is directed toward another wheel arm situated on the other side of the vehicle, and a second tube engaged partially inside the first tube and fixed at its outer end to the other wheel arm, the inner tube and the outer tube being joined together by at least two antiroll articulations made of elastomeric material, spaced apart in the longitudinal direction of the tubes and housed between the outside surface of the inner tube and the inside surface of the outer tube, each antiroll articulation having its own radial stiffness.

Such an axle crosspiece may be mounted either along the axis of articulation of the arms to the body of the vehicle or, alternatively, parallel to such axis, offset toward the wheels. This crosspiece improves the antiroll behavior of the wheel set concerned.

Each antiroll articulation may have a stiffness which differs in the radial direction; for example, the stiffness may be different in a direction which is vertical, horizontal or at 45°. To achieve that, an asymmetric antiroll articulation or one which has cavities in a determined distribution in the various directions may be provided. It is thus possible to best compensate for the deformation loadings which differ in the radial directions. Of course, it is also possible to use antiroll articulations the radial stiffness of which remains constant regardless of the radial direction.

Such a crosspiece poses a problem regarding the behavior of the vehicle, particularly in a bend, as a result of the flexural deformations of the axle crosspiece. This is because the two tubes of the crosspiece, which have different diameters, have different inertias. With a crosspiece according to the state of the art, the flexural deformations of the crosspiece depend substantially on the direction of the bend which means that the behavior of the vehicle changes according to whether the bend is to the left or to the right.

SUMMARY OF THE INVENTION

It is an object of the invention to provide an axle crosspiece of the foregoing type, which has substantially the same flexural deformations, at least for one considered radial direction, whatever the direction of the bend. In other words, the invention aims to provide an axle crosspiece which has flexural symmetry. It is also desirable for the crosspiece to remain simple in construction and of an acceptable cost price.

According to the invention, a vehicle axle crosspiece of the kind defined previously is characterized in that the antiroll articulations, each assigned a coefficient proportional to its radial stiffness, have a center of inertia which is closer to the wheel arm connected to the outer tube of the crosspiece than to the other wheel arm.

The contribution that the antiroll articulations make to the bending of the crosspiece may be likened to an "elastic pivot" situated at their center of inertia, having a flexural rigidity which depends on the radial stiffnesses of the articulations and on their spacing. The solution of the invention, by offsetting this center of inertia toward the side of the wheel arm connected to the more rigid outer tube, makes it possible to make the contribution of the pivot more appreciable on the side of such wheel arm, thus compensating for the difference in rigidity of the tubes and contributing to the symmetry of the flexural deformations of the crosspiece.

Advantageously, such offsetting of the center of inertia is obtained in part by the use of articulations which have different radial stiffnesses, the articulation closest to the wheel arm connected to the outer tube having the higher radial stiffness.

As a preference, the radial stiffness of the antiroll articulation closest to the wheel arm connected to the outer tube is at least 20%, and, more preferably still, at least 35%, greater than the radial stiffness of the other articulation.

Advantageously, the geometric center of the antiroll articulations is offset to the side of the arm connected to the outer tube, that is to say, closer to this arm than to the other arm. In particular, if L denotes the length of the crosspiece, the distance from the geometric center of the antiroll articulations to the arm connected to the outer tube is less than 0.45 L.

According to another aspect of the invention, which may be considered alone or in combination with the previous one, it is desirable to optimize the overall rigidity of the crosspiece. In particular, it is desirable to provide an axle crosspiece with antiroll elastic articulations which has good flexural rigidity without this in any way appreciably modifying the torsional behavior. It is furthermore desirable that the means of obtaining this result remain simple and economical.

According to this other aspect, the distance between the antiroll articulations of the axle crosspiece is chosen so as to optimize the flexural rigidity of the crosspiece as a function of the rigidities of the tubes and of the stiffnesses of the articulations.

Advantageously, the distance between the articulations is between pL and qL, L being the length of the crosspiece and p and q being coefficients equal to 0.3 and 0.6 respectively.

The invention also relates to a vehicle axle equipped with such an axle crosspiece.

Apart from the provisions set out hereinabove, the invention consists in a certain number of other provisions which will be described more explicitly hereinafter with regard to an exemplary embodiment described with reference to the appended drawing, but which is not in any way limiting.

DETAILED DESCRIPTION OF EXEMPLARY EMBODIMENT

Figure 1:
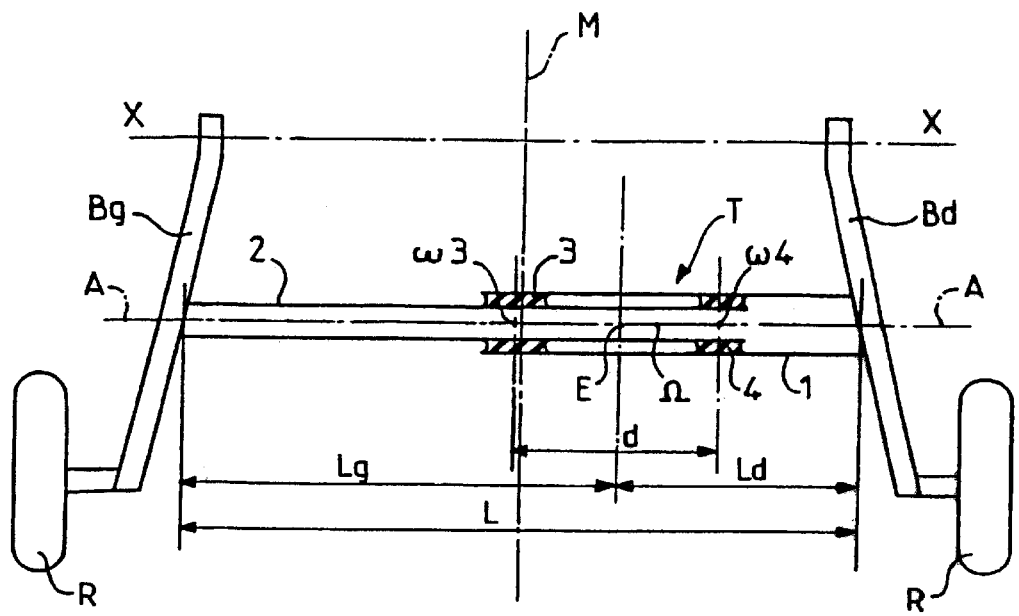
FIG. 1 of the drawing is a schematic plan view, partially in section, of an axle crosspiece according to the invention.
Figure 2:
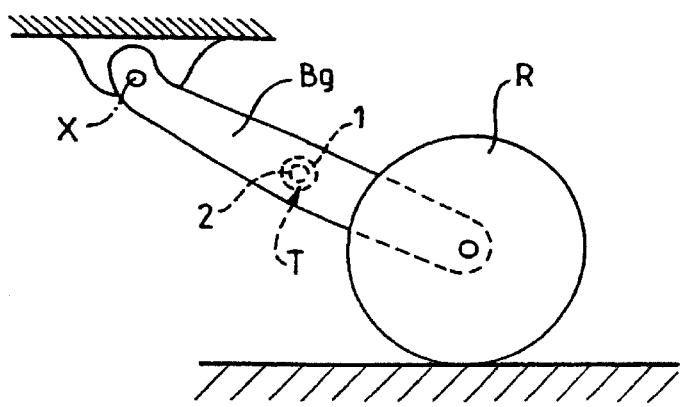
FIG. 2 is a schematic side view of a suspension arm with the crosspiece of FIG. 1.

Referring to the drawing, it is possible to see a vehicle rear axle crosspiece T. This crosspiece T includes a first tube 1, one end of which is fixed to a wheel arm Bd, which may be a trailing arm or a strut. The axis of articulation X—X of the arm Bd is situated forward of the axis of the wheel R in the case of a trailing arm. The tube 1 may be fixed to the arm Bd by welding. The other end of the tube 1 is directed towards the other wheel arm Bg, situated on the other side of the vehicle.

The crosspiece T also includes a second tube 2, of smaller diameter, fitted partially inside the tube 1. The outer end of the tube 2 is fixed to the other wheel arm Bg. The two tubes 1, 2 in the rest position have the same axis A—A parallel to the axis of rotation X—X of the arms Bd, Bg and offset towards the wheel R, that is to say, towards the rear with respect to the axis X—X. As an alternative, the axis A—A may coincide with the axis X—X.

The inner tube 2 and the outer tube 1 are joined together by two articulations 3, 4 made of elastomeric material, which are spaced apart by a distance d in the axial direction A—A of the tubes. The articulations 3, 4 are formed of rings or annuluses of elastomeric material or of separate blocks of elastomeric material arranged in a ring around the tube 2. Each articulation 3, 4 has its own radial stiffness. This radial stiffness may differ depending on the various radial directions to take account of the amplitudes of the deformation forces in these directions. For example, the radial stiffness may be different in the vertical direction, the horizontal direction or the direction at 45°. This may be obtained with an asymmetric elastic articulation or one that has cavities distributed accordingly according to the various radial directions.

Each articulation 3, 4 has a mid-plane orthogonal to the axis A—A and which intercepts this axis at a point $\omega 3$, $\omega 4$, respectively, corresponding to the center of the articulation. The inner and outer surfaces of the articulations 3, 4 are secured respectively to the outside surface of the tube 2 and to the inside surface of the tube 1, by adhesion or some equivalent method.

The radial stiffness of the articulations 3, 4 in a given radial direction for which it is desired that the crosspiece T exhibit symmetry of flexural rigidity are denoted by k3 and k4. The radial stiffness may be constant regardless of the radial direction, as the case maybe.

To ensure this symmetry of flexural rigidity, the assembly is such that the articulations 3, 4, allocated a coefficient proportional to their respective radial stiffness k3, k4, have a center of inertia $\Omega$ which is closer to the arm Bd connected to the outer tube 1 than to the other arm Bg. In other words, the center of inertia $\Omega$ situated on the axis A—A is offset toward the arm Bd with respect to the vertical longitudinal mid-plane M of the vehicle. The center of inertia $\Omega$ is that of the points $\omega 3$, $\omega 4$ allocated coefficients proportional to k3, k4.

The contribution that the articulations 3, 4 make to the flexing of the crosspiece T can be likened to an "elastic pivot" situated at the center of inertia $\Omega$ and having a stiffness that is a function of the stiffnesses of the articulations 3 and 4 and of their spacing.

By shifting the center of inertia $\Omega$ toward the arm Bd connected to the outer tube 1, which is the more rigid one, it can be ensured that the contribution of the articulations 3, 4 (and of the equivalent pivot) is more appreciable on the side of the arm Bd, thus compensating for the difference in rigidity of the tubes 1, 2.

As a preference, the radial stiffness k4 of the articulation 4 (the one closest to the arm Bd connected to the outer tube 1) is greater than that k3 of the articulation 3.

In particular, the radial stiffness k4 of the articulation 4 is at least 20%, and preferably at least 35%, greater than the radial stiffness k3 of the articulation 3.

Advantageously, the assembly is such that the geometric center E (point equidistant from the points $\omega 3$ and $\omega 4$) of the articulations 3 and 4 is also offset, with respect to the longitudinal vertical mid-plane M, toward the arm Bd connected to the outer tube 1. By denoting the length of the crosspiece T as L, the distance Ld from the geometric center E of the articulations to the arm Bd is less than 0.45 L, whereas the distance Lg from the point E to the arm Bg connected to the inner tube 2 is at least equal to 0.55 L.

Without constraints of cost, numerous combinations of geometry can be achieved by altering the stiffnesses of the articulations and of the tubes.

According to another aspect of the invention, it is desirable to optimize the overall rigidity of the crosspiece. In so doing, one is faced with opposing effects: if the two elastic articulations 3, 4 are separated, they act less in bending, and this increases the rigidity of the crosspiece. In acting in that way, however, the length between supports of the less rigid inner tube 2 is increased, and this has the opposite effect and plays a part in reducing the overall rigidity of the crosspiece T. Furthermore, if the radial rigidity of the antiroll articulations 3, 4 is increased, for example by changing the composition of the material of these articulations, this causes not only a change in the behavior with regard to radial forces, but also a change in the torsional behavior. The improvement in the flexural behavior of the crosspiece can therefore lead to an undesired change in the antiroll characteristics.

It is therefore desirable to supply an axle crosspiece with antiroll elastic articulations which has good flexural rigidity without in any way appreciably changing the torsional behavior.

To achieve that, the distance d between the two antiroll articulations 3, 4 and the overall positions of these articulations on the crosspiece T are chosen so as to optimize the flexural rigidity of the crosspiece T.

The distance d and the overall position of the articulations 3, 4 on the crosspiece may be determined experimentally and/or by calculation. The overall position of the articulations 3, 4 on the crosspiece is defined, for example, by the distance Lg between the geometric center E of the articulations and the left suspension arm Bg.

As a preference, the distance d between the articulations is between pL and qL, L being the length of the crosspiece T and p and q being coefficients equal to 0.3 and 0.6 respectively.

One advantageous example corresponds to L=1100 mm; the radial stiffness of the articulation 4=the radial stiffness of the articulation 3+45%, that is to say, k4=1.45 k3; d=400 mm and Lg=650 mm. This configuration corresponds to a center of inertia $\Omega$ situated about 137 mm away from the center of the crosspiece, on the side of the arm Bd connected to the outer tube 1.

Another advantageous example corresponds to L=826 mm; k4=2.4 k3; d=470 mm and Lg=448 mm. This configuration corresponds to a center of inertia $\Omega$ situated about 131 mm away from the center of the crosspiece, on the side of the arm connected to the outer tube.

The range 0.3L to 0.6L constitutes a bracket within which the distance d is chosen so as to optimize the overall rigidity as a function of the characteristics of the tubes, whereas common sense would dictate having the articulations as far away as possible in order to obtain the best flexural rigidity of the crosspiece.

Offsetting the center of inertia $\Omega$ of the articulations toward the arm Bd for the symmetry of flexural rigidity may reduce the length of the outer tube 1 and therefore reduce the flexural rigidity of the crosspiece as a whole. Here again, a compromise has to be reached, according to the requirements of the vehicle, between greater or lesser symmetry of flexural rigidity and greater or lesser overall flexural rigidity of the crosspiece.

The tubes 1, 2 described are theoretically of circular cross section, but may have a cross section of some shape other than circular. The term "diameter" used with regard to the tubes is therefore to be understood in a very broad sense as denoting a size rather than a precise shape of the cross section.

Although the invention has been described herein by reference to specific embodiments thereof, it will be understood that such embodiments are susceptible of variation and modification without departing from the inventive concepts disclosed. All such variations and modifications, therefore, are intended to be included within the spirit and scope of the appended claims.

What is claimed is:

1. A vehicle axle crosspiece, comprising:
   a first tube having an axis of elongation and first and second axial ends, the first tube being adapted to have the first axial end thereof connected to a first wheel arm situated on a first side of a vehicle and the second axial end thereof extending towards a second side of the vehicle opposite to said first side;
   a second tube extending in part axially within the first tube and having an axially inner end and an axially outer end relative to the first tube, the second tube being adapted to be connected at the axially outer end thereof to a second wheel arm situated on the second side of the vehicle;
   at least two antiroll articulations of elastomeric material joining the first and second tubes together, the at least two antiroll articulations being spaced apart in the longitudinal direction of the tubes and being housed between an outside surface of the second tube and an inside surface of the first tube;
   each of the at least two antiroll articulations having its own radial stiffness and being assigned a coefficient proportional to the respective radial stiffness; and
   said at least two antiroll articulations having a center of inertia which is closer to the first wheel arm than to the second wheel arm.

2. The axle crosspiece as claimed in claim 1, wherein the radial stiffness of the antiroll articulation closest to the first wheel arm is greater than the radial stiffness of the articulation closest to the second wheel arm.

3. The axle crosspiece as claimed in claim 1, wherein the radial stiffness of the antiroll articulation closest to the first wheel arm is at least 20% greater than the radial stiffness of the antiroll articulation closest to the second wheel arm.

4. The axle crosspiece as claimed in claim 1, wherein the radial stiffness of the antiroll articulation closest to the first wheel arm is at least 35% greater than the radial stiffness of the antiroll articulation closest to the second wheel arm.

5. The axle crosspiece as claimed in claim 1, wherein a geometric center equidistant from a midpoint of each of two of the at least two antiroll articulations is offset to the first side of the vehicle.

6. The axle crosspiece as claimed in claim 5, wherein said distance from the geometric center of the at least two antiroll articulations to the first wheel arm is less than 0.45 L, where L denotes the length of the crosspiece.

7. The axle crosspiece as claimed in claim 1, wherein the distance between the at least two antiroll articulations is between 0.3 L and 0.6 L, where L denotes the length of the crosspiece.

8. A vehicle axle, comprising:
   a first wheel arm situated on a first side of the a vehicle;
   a second wheel arm situated on a second side of the vehicle opposite to said first side; and
   an axle crosspiece, said crosspiece comprising:
      a first tube having an axis of elongation and first and second axial ends, the first tube being connected at the first axial end thereof to the first wheel arm and the second axial end of said first tube extending towards the second side of the vehicle;
      a second tube extending in part axially within the first tube and having an axially inner end and an axially outer end relative to said first tube, the second tube being connected at the axially outer end thereof to the second wheel arm;
      at least two antiroll articulations of elastomeric material joining the first and second tubes together, the at least two antiroll articulations being spaced apart in the longitudinal direction of the tubes and being housed between an outside surface of the second tube and an inside surface of the first tube;
      each of the at least two antiroll articulations having its own radial stiffness and being assigned a coefficient proportional to the respective radial stiffness; and
      said at least two antiroll articulations having a center of inertia which is closer to the first wheel arm than to the second wheel arm.

9. The vehicle axle as claimed in claim 8, wherein the radial stiffness of the antiroll articulation closest to the first wheel arm is greater than the radial stiffness of the articulation closest to the second wheel arm.

10. The vehicle axle as claimed in claim 8, wherein the radial stiffness of the antiroll articulation closest to the first wheel arm is at least 20% greater than the radial stiffness of the antiroll articulation closest to the second wheel arm.

11. The vehicle axle as claimed in claim 8, wherein the radial stiffness of the antiroll articulation closest to the first wheel arm is at least 35% greater than the radial stiffness of the antiroll articulation closest to the second wheel arm.

12. The vehicle axle as claimed in claim 8, wherein a geometric center equidistant from a midpoint of each of two of the at least two antiroll articulations is offset to the first side of the vehicle.

13. The vehicle axle as claimed in claim 12, wherein the distance from said geometric center of the at least two antiroll articulations to the first wheel arm is less than 0.45 L, where L denotes the length of the crosspiece.

14. The vehicle axle as claimed in claim 8, wherein the distance between the at least two antiroll articulations is between 0.3 L and 0.6 L, where L -denotes the length of the crosspiece.

* * * * *